United States Patent
Lee et al.

(10) Patent No.: US 10,034,169 B2
(45) Date of Patent: Jul. 24, 2018

(54) METHOD TO AUTHENTICATE PEERS IN AN INFRASTRUCTURE-LESS PEER-TO-PEER NETWORK

(71) Applicant: QUALCOMM Incorporated, San Diego, CA (US)

(72) Inventors: Soo Bum Lee, San Diego, CA (US); Abhishek Pramod Patil, San Diego, CA (US); George Cherian, San Diego, CA (US); Santosh Paul Abraham, San Diego, CA (US); Anand Palanigounder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 591 days.

(21) Appl. No.: 14/539,275

(22) Filed: Nov. 12, 2014

(65) Prior Publication Data
US 2016/0135045 A1 May 12, 2016

(51) Int. Cl.
*H04W 12/06* (2009.01)
*H04L 29/06* (2006.01)
(Continued)

(52) U.S. Cl.
CPC .............. *H04W 12/06* (2013.01); *H04L 9/08* (2013.01); *H04L 9/0833* (2013.01); *H04L 63/065* (2013.01); *H04L 63/08* (2013.01); *H04W 12/04* (2013.01); *H04L 63/0807* (2013.01); *H04L 2463/121* (2013.01)

(58) Field of Classification Search
CPC .... H04W 12/04; H04W 12/06; H04L 63/065; H04L 63/08; H04L 63/0823; H04L 9/08; H04L 9/0833
See application file for complete search history.

(56) References Cited

U.S. PATENT DOCUMENTS 7,234,058 B1 6/2007 Baugher et al.
8,621,201 B2 12/2013 Costa et al.
(Continued)

FOREIGN PATENT DOCUMENTS

CN 101426201 A 5/2009
EP 1396979 A2 3/2004

OTHER PUBLICATIONS

ISA/EPO, International Search Report and Written Opinion of the International Searching Authority, Int'l. App. No. PCT/US2015/055465, dated Jan. 22, 2016, European Patent Office, Rijswijk, NL, 11 pgs.

*Primary Examiner* — Robert B Leung
(74) *Attorney, Agent, or Firm* — Holland & Hart LLP

(57) ABSTRACT

Methods, systems, apparatuses, and devices are described for authenticating in a network. A mobile device may establish a group account with an authentication server associated with the group. Upon successfully completing group account establishment, the mobile device receives a group authentication token that includes information associated with the authentication server, the group, the mobile device, a group key, versioning information, etc. The mobile device may use the group authentication token to authenticate with another mobile device that is a member of the same group. The versioning information may support backwards-compatibility between the group authentication tokens having different versions.

30 Claims, 11 Drawing Sheets

(51) Int. Cl.
*H04L 9/08* (2006.01)
*H04W 12/04* (2009.01)

(56) References Cited

U.S. PATENT DOCUMENTS

| | | | |
|---|---|---|---|
| 8,706,085 | B2 | 4/2014 | Zhang et al. |
| 2003/0166397 | A1 | 9/2003 | Aura |
| 2004/0044891 | A1* | 3/2004 | Hanzlik .............. H04L 63/0272 |
| | | | 713/150 |
| 2005/0138352 | A1 | 6/2005 | Gauvreau et al. |
| 2007/0127719 | A1* | 6/2007 | Selander ............... H04L 9/0861 |
| | | | 380/277 |
| 2007/0294748 | A1* | 12/2007 | Lin ........................ H04L 9/32 |
| | | | 726/4 |
| 2008/0010242 | A1 | 1/2008 | Jin et al. |
| 2008/0046740 | A1* | 2/2008 | Narayanan ............ H04L 63/083 |
| | | | 713/176 |
| 2008/0170692 | A1* | 7/2008 | Eastham ............... H04L 9/0891 |
| | | | 380/277 |
| 2009/0086973 | A1 | 4/2009 | Buddhikot et al. |
| 2010/0189259 | A1* | 7/2010 | Kaler .................... H04L 67/104 |
| | | | 380/255 |
| 2010/0208898 | A1* | 8/2010 | Acar .................... H04L 9/0833 |
| | | | 380/280 |
| 2013/0036305 | A1 | 2/2013 | Yadav et al. |
| 2013/0179951 | A1* | 7/2013 | Broustis .............. H04L 63/0435 |
| | | | 726/6 |

\* cited by examiner

METHOD TO AUTHENTICATE PEERS IN AN INFRASTRUCTURE-LESS PEER-TO-PEER NETWORK

BACKGROUND

The present disclosure relates to wireless communication systems, and more particularly, to authentication in a wireless network.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a Wireless Local Area Network (WLAN), such as a Wi-Fi network (IEEE 802.11) may include an access point (AP) that may communicate with one or more stations (STAs) or mobile devices. The AP may be coupled to a network, such as the Internet, and enable a mobile device to communicate via the network (and/or communicate with other devices coupled to the access point).

In some examples, networks may be formed for content sharing between a group of mobile devices that share some commonality (e.g., are associated with a common group, organization, military unit, etc.). The mobile devices may form the network (e.g., a mesh network, a social Wi-Fi mesh network, and the like) by authenticating with other mobile devices on the network based on a common key or token associated with the commonality, e.g., a group authentication token. Conventional network authentication schemes, however, may struggle with ensuring each mobile device associated with the group has the common key or password or order to authenticate with a group mobile device on the network.

In some authentication schemes, all mobile devices may have to always possess the most common key before they can authenticate with a group mobile device (peer-to-peer authentication). In large networks (e.g., 1,000+ mobile devices), scaling may quickly become a concern as distribution of the common key or password may be particularly difficult, e.g., offline mobile devices may not be able to receive an updated key. Other authentication schemes may require a connection between the mobile station and an authentication server, which authenticates the mobile device to the network. This, however, may not be successful when the mobile device cannot establish an online connection and, when online, expends network resources.

SUMMARY

The described features generally relate to various improved systems, methods, and/or apparatuses for wireless communications. Such systems, methods, and/or apparatuses may provide for authentication in a network, e.g., authentication between mobile devices forming a mesh network. Generally, a mobile device may establish a group account with an authentication server (AS) and, based on the account, receive a token. The AS may be associated with a group and the token may be a group authentication token (AuT). In some aspects, the AuT may provide proof of group membership and be used by a joining device to authenticate with another mobile device on the network that is associated with the same group. In some aspects, the first mobile device (joining device) may establish and receive the AuT while online or in a connected mode and, subsequently authenticate with the second mobile device (group or member device) without requiring a connection to the AS. The AuT may include versioning information and the joining device may authenticate with the member device using an AuT having a different version of the AuT than the member device. Accordingly, described authentication based on the AuT avoids the requirement for an active connection to an AS and/or immediate distribution of the most current key found in current authentication techniques.

In a first set of illustrative examples, a method for wireless communication is provided. The method may include: establishing, by a first device joining a group, a group account with an authentication server, the authentication server associated with the group; receiving a group authentication token from the authentication server, the group authentication token associated with an established group account; and authenticating with a second device of a network based at least in part on the group authentication token, the second device being a member of the group.

In some aspects, the method may include: establishing the group account and receiving the group authentication token while in a connected state with the authentication server; and authenticating with the second device while in a disconnected state with the authentication server. The method may include: completing a first authentication with the second device based at least in part on the second device confirming that the group authentication token is associated with the group; and completing a second authentication with the second device based at least in part on the second device confirming that the group authentication token is associated with the first device.

In some aspects, the method may include receiving an updated group authentication token from the authentication server on one of a periodic schedule, an aperiodic schedule, or combinations thereof. Each received group authentication token and updated group authentication token may include a version index associated with a version for the particular group authentication token and wherein authenticating with the second device may include authenticating with the second device using a group authentication token having a different version than a group authentication token being used by the second device for authentication. The method may include authenticating with the second device using a group authentication token having a newer version of the group authentication token than the version being used by the second device. The method may include authenticating with the second device using a group authentication token having an older version of the group authentication token than the version being used by the second device. Each updated group authentication token may include a reason code indicating the reason the group authentication token was updated. At least one reason code may prohibit the first device from authenticating with the second device using the group authentication token having a different version. At least one reason code may permit the first device to authenticate with the second device using the group authentication token having a different version.

In some aspects, the group authentication token may include one of a group identifier associated with the group, an authentication server identifier, a first device identifier, a group authentication key, a version index associated with the group authentication key, a timing information field, or combinations thereof. The group authentication token may be valid for a predetermined time period. The network may be a mesh network. The network may be a social Wi-Fi mesh network.

In a second illustrative set of examples, an apparatus for wireless communication is provided. The apparatus may include: a processor; memory in electronic communication with the processor; and instructions being stored in the memory. The instructions may be executable by the processor to: establish, by a first device joining a group, a group account with an authentication server, the authentication server associated with the group; receive a group authentication token from the authentication server, the group authentication token associated with an established group account; and authenticate with a second device of a network based at least in part on the group authentication token, the second device being a member of the group.

In some aspects, the apparatus may include instructions executable by the processor to: establish the group account and receiving the group authentication token while in a connected state with the authentication server; and authenticate with the second device while in a disconnected state with the authentication server. The apparatus may include instructions executable by the processor to: complete a first authentication with the second device based at least in part on the second device confirming that the group authentication token is associated with the group; and complete a second authentication with the second device based at least in part on the second device confirming that the group authentication token is associated with the first device.

In some aspects, the apparatus may include instructions executable by the processor to receive an updated group authentication token from the authentication server on one of a periodic schedule, an aperiodic schedule, or combinations thereof. Each received group authentication token and updated group authentication token may include a version index associated with a version for the particular group authentication token and wherein the instructions to authenticate with the second device are further executable by the processor to authenticate with the second device using a group authentication token having a different version than a group authentication token being used by the second device for authentication.

In some aspects, the apparatus may include instructions executable by the processor to authenticate with the second device using a group authentication token having a newer version of the group authentication token than the version being used by the second device. The apparatus may include instructions executable by the processor to authenticate with the second device using a group authentication token having an older version of the group authentication token than the version being used by the second device. Each updated group authentication token may include a reason code indicating the reason the group authentication token was updated. At least one reason code may prohibit the first device from authenticating with the second device using the group authentication token having a different version. At least one reason code may permit the first device to authenticate with the second device using the group authentication token having a different version.

In some aspects, the group authentication token may include one of a group identifier associated with the group, an authentication server identifier, a first device identifier, a group authentication key, a version index associated with the group authentication key, a timing information field, or combinations thereof. The group authentication token may be valid for a predetermined time period. The network may be a social Wi-Fi mesh network.

In a third set of illustrative examples, an apparatus for wireless communication is provided. The apparatus may include: means for establishing, by a first device joining a group, a group account with an authentication server, the authentication server associated with the group; means for receiving a group authentication token from the authentication server, the group authentication token associated with an established group account; and means for authenticating with a second device of a network based at least in part on the group authentication token, the second device being a member of the group.

In some aspects, the apparatus may include: means for establishing the group account and receiving the group authentication token while in a connected state with the authentication server; and means for authenticating with the second device while in a disconnected state with the authentication server.

In a fourth set of illustrative examples, a non-transitory computer-readable medium storing computer-executable code for wireless communication is provided. The code may be executable by a processor to: establish, by a first device joining a group, a group account with an authentication server, the authentication server associated with the group; receive a group authentication token from the authentication server, the group authentication token associated with an established group account; and authenticate with a second device of a network based at least in part on the group authentication token, the second device being a member of the group.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In current robust security network association (RNSA) techniques, authentication between devices (peer-to-peer authentication) uses simultaneous authentication of equals (SAE) protocols that require each device to have the same key or password. The SAE techniques are generally designed for peer authentication without the need for infrastructure support, e.g., without a live connection to an AS during authentication. Changes to the common key or password, however, may become problematic due to difficulties associated with distributing the updated key to each device in a timely manner. Other techniques may rely on extensible authentication protocols (EAP) which require each device (e.g., mobile device, access point, etc.) to connect, and authenticate with, an AS. Once authenticated, the device may receive a pairwise master key (PMK) which is shared between devices for communication. Not every environment, however, may support EAP techniques due to no or reduced access to a connection, restrictions on network resources, etc.

Aspects of the present disclosure relate to authentication in a network between devices sharing certain aspects of an AuT. A mobile device may connect to an AS to create a group account and receive the AuT. The AS may be associated with the group and may, generally, manage aspects of providing AuTs for devices authorized to associate with the group. The mobile device may discover a second mobile device associated with the group and may authenticate with the second device based on the AuT. In some examples, the joining device and/or the member device may not have an active connection to the AS during authentication. Aspects of the AuT may provide for compatibility between different versions of the AuT such that authentication may be permitted for a device not having the most recent AuT.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
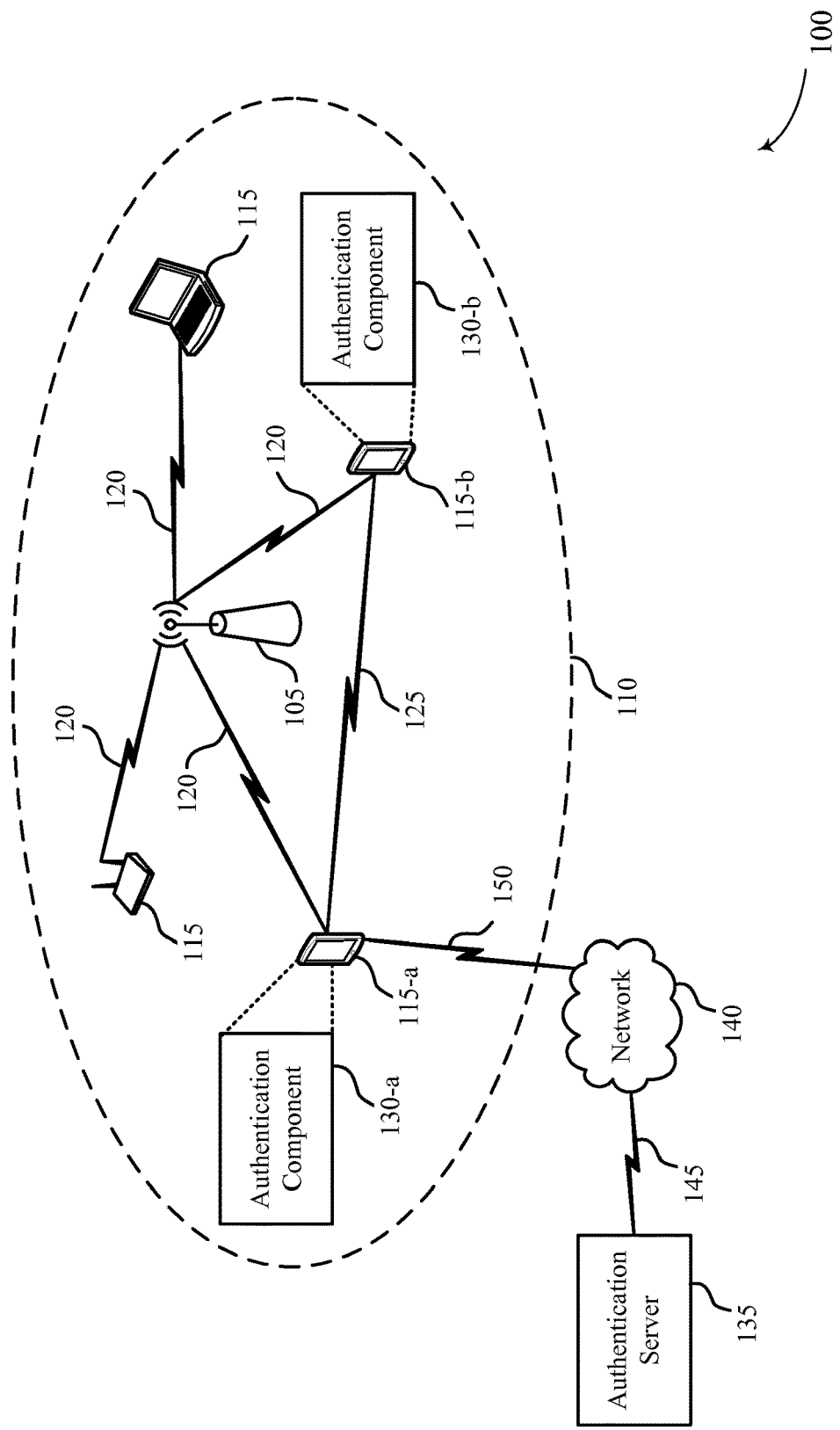
FIG. 1 shows a block diagram of a wireless communication system, in accordance with various aspects of the present disclosure.

Referring first to FIG. 1, a block diagram illustrates an example of a WLAN network 100. The WLAN network 100 may include an access point (AP) 105 and one or more wireless devices or stations (STAs) 115, such as mobile stations, personal digital assistants (PDAs), other handheld devices, netbooks, notebook computers, tablet computers, laptops, display devices (e.g., TVs, computer monitors, etc.), printers, etc. While only one AP 105 is illustrated, the WLAN network 100 may have multiple APs 105. Each of the wireless stations 115, which may also be referred to as mobile stations (MSs), mobile devices, access terminals (ATs), user equipment (UE), subscriber stations (SSs), or subscriber units, may associate and communicate with an AP 105 via a communication link 120. Each AP 105 has a geographic coverage area 110 such that wireless stations 115 within that area can typically communicate with the AP 105. The wireless stations 115 may be dispersed throughout the geographic coverage area 110. Each wireless station 115 may be stationary or mobile.

Although not shown in FIG. 1, a wireless station 115 can be covered by more than one AP 105 and can therefore associate with one or more APs 105 at different times. A single AP 105 and an associated set of stations may be referred to as a basic service set (BSS). An extended service set (ESS) is a set of connected BSSs. A distribution system (DS) (not shown) is used to connect APs 105 in an extended service set. A geographic coverage area 110 for an access point 105 may be divided into sectors making up only a portion of the coverage area (not shown). The WLAN network 100 may include access points 105 of different types (e.g., metropolitan area, home network, etc.), with varying sizes of coverage areas and overlapping coverage areas for different technologies. Although not shown, other wireless devices can communicate with the AP 105.

While the wireless stations 115 may communicate with each other through the AP 105 using communication links 120, each wireless station 115 may also communicate directly with one or more other wireless stations 115 via a direct wireless link 125. Two or more wireless stations 115 may communicate via a direct wireless link 125 when both wireless stations 115 are in the AP geographic coverage area 110 or when one or neither wireless station 115 is within the AP geographic coverage area 110 (not shown). Examples of direct wireless links 125 may include Wi-Fi Direct connections, connections established by using a Wi-Fi Tunneled Direct Link Setup (TDLS) link, and other P2P group connections. The wireless stations 115 in these examples may communicate according to the WLAN radio and baseband protocol including physical and MAC layers. In other implementations, other peer-to-peer connections and/or ad hoc networks may be implemented within WLAN network 100.

One or more wireless stations 115 may be associated with the same group and wish to connect to form a mesh network, e.g., connect directly and not through AP 105. For example, wireless station 115-*a* may determine that wireless station 115-*b* shares a commonality, e.g., is associated with the same group, and initiate an authentication procedure to connect directly to wireless station 115-*b* for content sharing, for example. Each wireless station 115 may include an authentication component 130 that manages aspects of group association and AuT management. For example, wireless station 115-*a* may include an authentication component 130-*a* that may manage aspects of establishing a group account and receive a AuT from an AS 135 over the network 140 via wireless links 145 and 150. Wireless links 145 and/or 150 may be cellular communications wireless links, for example. Wireless station 115-*b* may similarly include an authentication component 130-*b* that may manage aspects of group account establishment and AuT management. Wireless station 115-*a* may initiate, via wireless link 125, an authentication procedure directly with wireless station 115-*b* based on the AuT received from AS 135. Upon authentication, wireless stations 115-*a* and 115-*b* may form the mesh network.

Figure 2:
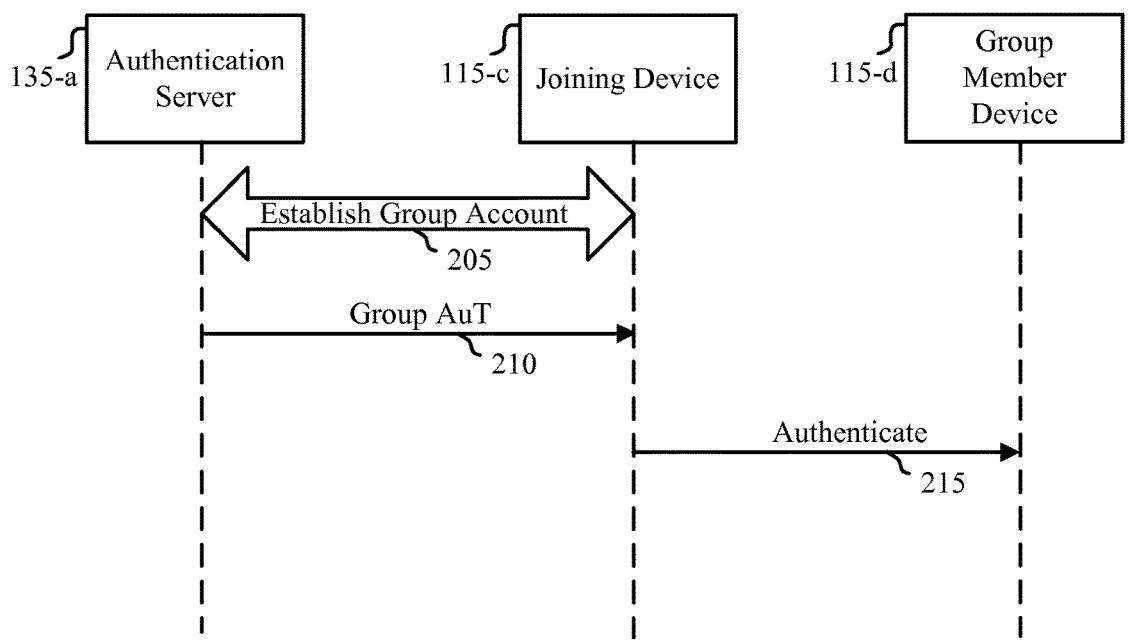
FIG. 2 shows a swim lane diagram illustrating aspects of wireless communication, in accordance with aspects of the present disclosure.

FIG. 2 is a swim lane diagram 200 illustrating aspects of wireless communication, in accordance with various aspects of the present disclosure. The diagram 200 may illustrate aspects of the wireless communication system 100 described with reference to FIG. 1. The diagram 200 includes an authentication server 135-*a*, a joining device 115-*c*, and a group member device 115-*d*. The joining device 115-*c* and/or the group member device 115-*d* may be an example of at least one of the wireless stations 115 described above with respect to FIG. 1. The authentication server 135-*a* may be an example of at least one of the authentication servers 135 described above with respect to FIG. 1. Generally, the diagram 200 illustrates aspects of authenticating in a network based on a group authentication token. In some examples, a system device, such as one of the wireless stations 115, authentication servers 135, and/or APs 105 may execute sets of codes to control the functional elements of the device to perform some or all of the functions described below.

At block 205, the joining device 115-*c* may establish a group account with the AS 140-*a*. Generally, a group may refer to any shared interest and/or common feature shared among the group members. As some non-limiting examples, a group may refer to a service provider, e.g., a cellular service provider, a WLAN service provider, and the like. A group may also refer to a common feature between the devices 115, e.g., a common manufacturer. A group may also refer to an application account, e.g., devices 115 having a common application or service running on the devices 115, a commercial account (a Google® account, a Yahoo® account, an Amazon® account, etc.). A group may also refer to mobile devices associated with a common organization, e.g., a common employer, sports group, etc. Accordingly, it is to be understood that a wide variety of common interests and/or features may constitute association with a group.

Creating the group account may include the joining device 115-*c* providing various information to the AS 140-*a*, e.g., device identification information, user name, address, and the like, to confirm the joining device 115-*a* is authorized to associate with the group. In one non-limiting example, the initial creation of the group account may include the AS 140-*a* and the joining device 115-*c* being located together, e.g., an newly hired employee bringing their mobile phone to the company IT department for registration. At 210, the AS 140-*a* may provide a group authentication token (AuT) to the joining device 115-*c*. The AuT may provide, from the perspective of the joining device 115-*c*, proof of membership in the group.

At 215, the joining device 115-*c* may authenticate with the group member device 115-*d*. The authentication may be based on the AuT. Although described as the joining device 115-*c* authenticating with the group member device 115-*d*, it is to be understood that mutual authentication may occur during the authentication procedure, e.g., the group member device 115-*d* and the joining device 115-*c* mutually authenticate with each other.

Upon completion of the authentication procedure, the joining device 115-*c* and the group member device 115-*d* form a mesh network. That is, the mesh network may be formed by members of the same group authentication with each other based on the group AuT. As more devices 115 detect and authenticate with the joining device 115-*c* and/or the group member device 115-*d*, the mesh network will increase. In some examples, the devices 115 may form a social Wi-Fi mesh network, an Independent Basic Service Set (IBSS) network, and the like. In some contexts, the network may also be referred to as a neighbor aware network (NAN) data path, a NAN data link, a data path (DP), a data link (DL), a NAN DP, a NAN DL, a NDP, or a NDL. Accordingly, the member devices 115 forming the network may also be referred to, in some contexts, as mesh stations, as a mesh group, as a data path group, a NAN DP group, a data link group, or a NAN DL group. It is to be understood that the terminology provided above are examples only and the present disclosure may refer to any peer-to-peer infrastructure-less network.

Figure 3:
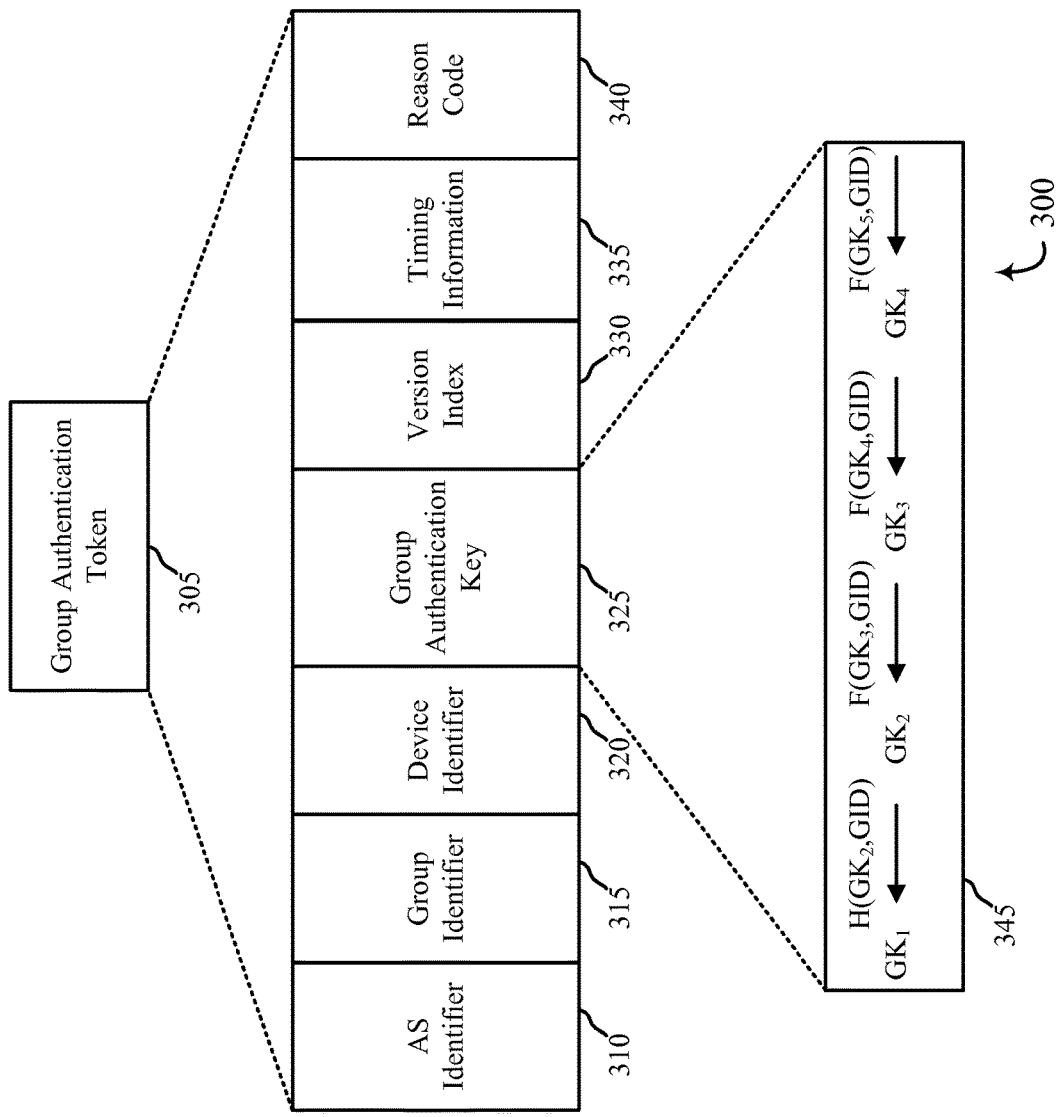
FIG. 3 shows a diagram illustrating aspects of an example authentication token, in accordance with aspects of the present disclosure.

FIG. 3 is a diagram 300 illustrating aspects of an example group authentication token (AuT) 305, in accordance with various aspects of the present disclosure. The diagram 300 may illustrate aspects of the wireless communication system 100 described with reference to FIG. 1. The diagram may be implemented by at least one of the wireless stations 115, access points 105, joining device 115, and/or group member device 115, described above with respect to FIGS. 1 and/or 2.

As discussed, various aspects of the AuT 305 may provide for authentication between a joining device 115 and a group member device 115 using AuT 305. Generally, the AuT 305 may include various properties to facilitate such authentication according to the present described features. For example, the AuT 305 may include an AS identifier 310, a group identifier 315, a device identifier 320, a group authentication key 325, a version index 330, timing information 335, and a reason code 340. Broadly, the AuT 305 may be time limited, may be bound to a particular mobile device 115, and include a group secret to facilitate authentication between the devices 115. One or more components of the AuT 305, and/or functions based on such components, may be used as a signature for the AuT 305.

The AS identifier 310 may include one or more information elements associated with identifying the AS. The AS identifier 310 may indicate and/or confirm that the AS is associated with the group, e.g., $AuT_{Google+}$, $AuT_{AT\&T}$, $AuT_{Company}$, etc. Within the context of the group, the AS may be a trusted third party (TTP). In some aspects, the AS identifier 310, or a function based on the AS identifier 310, may identify a public key that may be used during the authentication process to verify the signature of the AuT 305.

The group identifier 315 may include one or more information elements used to identify the group associated with the AuT 305. For example where the group is associated with a particular manufacturer, the group identifier 315 and/or a function based on the group identifier 315 (e.g., hash function) may be used to confirm that the AuT 305 is associated with the particular group, e.g., $AuT_{Manufacturer}$. The group identifier 315 may bind the AuT 305 to the particular group. In some examples, the AS may define more than one group to be associated with a key. Within the domain of the AS, the group identifier 315 may be unique, for a particular group, for example.

The device identifier 320 may include one or more information elements associated with identifying the mobile device 115 that receives the AuT 305. Generally, each AuT 305 is mobile device specific, i.e., bound to the particular mobile device. Accordingly, a first AuT 305 associated with a first mobile device 115 may not be transferable to a second mobile device 115, e.g., for fraud prevention. In some examples, the device identifier 320 may be associated with a media access controller (MAC) address of the mobile device. Other device unique information may also be included in and/or derivable from the device identifier 320.

The group authentication key 325 may include one or more information elements associated with a common secret for the group, e.g., password, master key, etc. The group authentication key 325 and/or functions based on the group authentication key 325 may be used for signature verification of the AuT 305. As one non-limiting example, the group authentication key 325 may be formed as a hash function of the group secret or key being hashed repeatedly with the group identifier 315, for example. The group identifier 315 may be used as an input to the hash function to generate a unique hash chain for each group. In some aspects, the group authentication key 325 is used in the reverse order of generation, which enables a device holding an AuT 305 with GK(i+1) to authenticate with another device holding an AuT 305 with GK(i).

In one non-limiting example, the group authentication key 325 may be constructed according to the process 345, where GK(n) is randomly generated first, GK(n−1) is generated by applying a function F to GK(n) with the group identifier (GID) (i.e., GK(n−1)=F(GK(n),GID)), where F is a key derivation function, e.g., HMAC-256, HMAC-384. This procedure may continue until GK(1) is generated. The group authentication key 325 may be constructed by the AS to have a predetermined length (e.g., n) and an initial group key (e.g., GK(1)) may be signed by the AS. Subsequent keys may be authenticated by hashing the key in a repeated fashion, e.g., GK(2) may be authenticated by applying a function (F(GK(2),GID)) and comparing it with GK(1) since GK(1) is authenticated by the AS. In some examples, the group authentication key 325 is distributed to mobile devices in the reverse order of creation, e.g., GK(4) is generated first and GK(3) is generated next since GK(3) is derived from GK(4) by construction, yet GK(3) is distributed first, GK(4) is distributed next, and so on. When the key chain is exhausted, e.g., the final group authentication key 325 is distributed, a new chain may be created with and signed by the AS. In some examples, the mobile devices may be provided the root key (GK(1)) during initial account establishment and may use the root key to authenticate subsequent iterations of the group authentication key 325.

The version index 330 may include one or more information elements associated with indicating a version of the AuT 305. The AS may update the AuT 305 for various reasons, e.g., timed-rollover for maintenance, group authentication key compromise, etc. The AS may, in some examples, create the group authentication key 325 using the hash function based on the group secret being hashed with the group identifier 315. The version index 330 may indicate which iteration of the hashing function is associated with the current AuT 305. In some examples, the AS may sign the first iteration of the group authentication key 325, which may include the version index (i), and distribute the group authentication key 325 (e.g., GK(i)) to the member devices associated with the group, e.g., during initial registration and AuT 305 distribution. In some aspects, the group member devices 115 may connect to and synchronize with the AS whenever they are online and are able to connect. The AS may, however, distribute subsequent versions of the AuT 305 (e.g., GK(i+1)) to member devices without signature. Accordingly, the group member devices may confirm the AuT 305 is associated with the group AS and yet, for further versions, realize reduced computational and/or communication overhead. In some examples, the subsequent version of the GK(i+1) is generated such that group member devices may verify the authenticity of GK(i+1) using GK(i) or prior versions of GKs, e.g., GK(i−1), GK(i−2), etc.

In some examples, the signature for the AuT 305 may be a function of one or more components of the AuT 305. For example, the signature of the AuT 305 may be Sign= $\{H_{GK(KIdx)}(ASID\|GID\|STAID\|KIdx)\}_{K^{-1}{}_{AS}}$, where ASID is the AS Identifier 310, GID is the group identifier 315, STAID is the device identifier 320, and KIdx is the version index 330. Accordingly, the AuT 305 may include a signature that binds the AuT 305 to the group and to the particular device.

The timing information 335 may include information elements associated with timing for the AuT 305. The AuT 305 may be updated on a periodic schedule and/or be considered valid for a predetermined time period. The AuT 305 may be time limited and the timing information 335 may include information identifying the time limit, e.g., hourly, daily, weekly, monthly, yearly, etc.

The reason code 340 may include one or more information elements associated with a reason the AuT 305 was updated. Non-limiting examples of reason codes may include scheduled group authentication key 325 rollover (e.g., time expired), a scheduled AS private key change, a key compromise (e.g., the group authentication key 325 and/or the AS private key), a policy change within the group, etc. As discussed in more detail below, the reason code may, in some examples, determine whether a group member device authenticates with a joining device having a different version AuT 305. That is, the reason code 340 may help member devices determine whether they accept or reject a group authentication key 325.

Broadly, the presently described authentication techniques, based on the AuT 305, provide for establishment of a large-scale, secure social Wi-Fi mesh network that efficiently utilizes security among group member devices. The AuT 305 provides for efficient and scalable group authentication management, e.g., group key distribution and updates, membership management, etc., and yet provides for efficient authentication between member devices.

Figure 4:
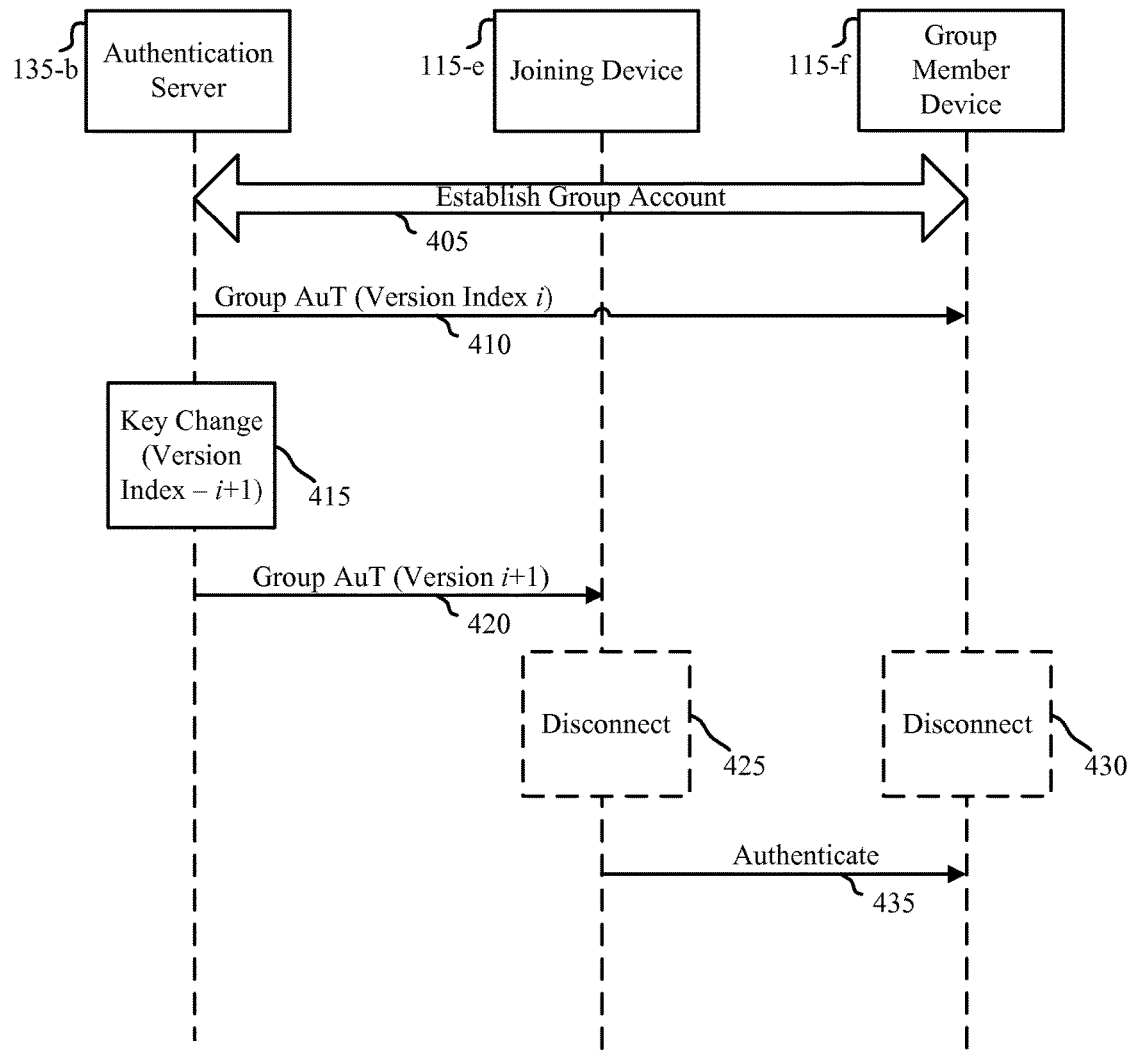
FIG. 4 shows a swim lane diagram illustrating aspects of wireless communication, in accordance with aspects of the present disclosure.

FIG. 4 is a swim lane diagram 400 illustrating aspects of wireless communication, in accordance with various aspects of the present disclosure. The diagram 400 may illustrate aspects of the wireless communication system 100 described with reference to FIG. 1. The diagram 400 includes an authentication server 135-*b*, a joining device 115-*e*, and a group member device 115-*f* The joining device 115-*e* and/or the group member device 115-*f* may be an example of at least one of the wireless stations 115 described above with respect to FIG. 1. The authentication server 135-*b* may be an example of at least one of the authentication servers 135 described above with respect to FIG. 1. Generally, the diagram 400 illustrates aspects of authenticating in a network based on a group authentication token. In some examples, a system device, such as one of the wireless stations 115, authentication servers 135, and/or APs 105 may execute sets of codes to control the functional elements of the device to perform some or all of the functions described below.

At 405, the group member device 115-*f* may establish a group account with the AS 140-*b*. Generally, the group account may be established based on the exchange of various information between the group member device 115-*f* and the AS 140-*b*, e.g., group member device 115-*f* identification information. At 410, the AS 140-*b* may provide a group AuT to the group member device 115-*f* As previously discussed, the group AuT may change for various reasons where each version of the AuT may include a version index (e.g., version index 330). Accordingly, the group member device 115-*f* may receive and store a AuT with version index i.

At block 415, the AS 140-*b* may experience a key change. The key change, e.g., the group authentication key 325 and/or a private key of the AS 140-*b*, may be scheduled or unscheduled. Based on the updated AuT, the AS 140-*b* may increment the version index to i+1. Accordingly, AuTs issued from the AS 140-*b* have a different version index than previously issued AuTs.

At 420, the AS 140-*b* may send an updated AuT to the joining device 115-*e*. In this example, the joining device 115-*e* may be a device that has previously established a group account with the AS 140-*b* and received an AuT. In some aspects, the devices associated with the group may re-connect with the AS 140-*b* to receive an updated AuT. For example, a device may connect to the AS 140-*b* when it is online (e.g., has an active connection), according to a predetermined schedule, etc., to check for and, if available receive (e.g., pull) a current version of the AuT. In some examples, the AS 140-*b* may send one or more signals to its registered member devices pushing the updated AuT, for those member devices that are connected and available. Therefore, the updated AuT with version index i+1 is provided to the joining device 115-*e*.

Optionally at blocks 425 and/or 430, the joining device 115-*e* and group member device 115-*f* may disconnect from the AS 140-*b*. For example, either device may lose its active internet connection and/or lose its connection to the AS 140-*b*. Accordingly, the group member device 15-*f* may not be available to connect to the AS 140-*b* to receive the AuT having version index i+1.

At 435, the joining device 115-*e* may authenticate with the group member device 115-*f* using an AuT with version index i+1 whereas the group member device 115-*f* accepts the authentication using an AuT with version index i. As discussed, the AuT provided herein may permit forwards and/or backwards compatibility for authentication between devices. That is, a device holding a recent AuT can authenticate with other devices holding a newer AuT or an older AuT. Hence, devices are not required to synchronize with the AS 140-*b* at all times and yet support authentication using a versioned AuT. In some examples, the group member device 115-*f* may authenticate the joining device 115-*e* based on the reason code, e.g., the reason code indicates that the key change was scheduled and, therefore, the group member device 115-*f* trusts the AuT from the joining device despite the different version index. In another example, the group member device 115-*f* may authenticate the joining device 115-*e* based on the differences between the version index, e.g., up to one, two, three, etc., different versions are support for authentication. Other authentication determinations may be based on a combination of the reason code, the version index, as well as other factors known to the group member device 115-*f* and/or the joining device 115-*e*. Accordingly, the group member device may authenticate using version indexes that are newer and/or older than the version index from the joining device.

Figure 5:
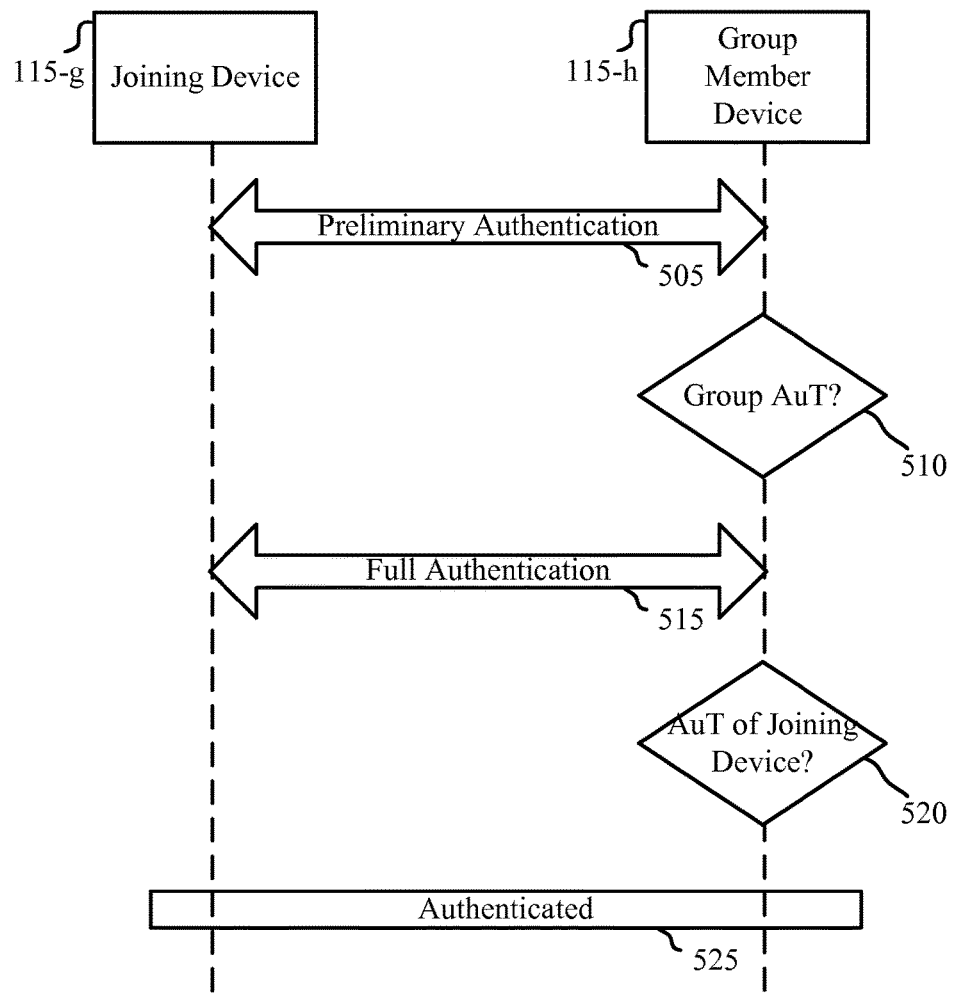
FIG. 5 shows a swim lane diagram illustrating aspects of wireless communication, in accordance with aspects of the present disclosure.

FIG. 5 is a swim lane diagram 500 illustrating aspects of wireless communication, in accordance with various aspects of the present disclosure. The diagram 500 may illustrate aspects of the wireless communication system 100 described with reference to FIG. 1. The diagram 500 includes a joining device 115-*g* and a group member device 115-*h*. The joining device 115-*g* and/or the group member device 115-*h* may be an example of at least one of the wireless stations 115 described above with respect to FIG. 1. Generally, the diagram 500 illustrates aspects of two-phase authenticating in a network based on a group authentication token. In some examples, a system device, such as one of the wireless stations 115, authentication servers 135, and/or APs 105 may execute sets of codes to control the functional elements of the device to perform some or all of the functions described below. It is to be understood that the joining device 115-*g* and the group member device 115-*h* have previously registered with an AS and received at least one AuT associated with the group.

At 505, the joining device 115-*g* and the group member device 115-*h* may perform a preliminary authentication. Generally, the preliminary authentication may include exchanging at least a portion of the AuT, e.g., the group authentication key and the current version index (e.g., GK(Index)). Based on that exchange, each device 115 may determine whether the other device holds a valid group authentication key and deny authentication to those who do not. The preliminary authentication may provide a quick and efficient mechanism to mitigate denial of service attacks, for example.

At 510, the group member device 115-*h* may determine whether the AuT is associated with the group, e.g., the group authentication key is valid. If so and at 515, the joining device 115-*g* and the group member device 115-*h* may perform a full authentication procedure. In some aspects, the preliminary authentication may be sufficient for the devices 115 to connect, e.g., to form the mesh network. Accordingly, the preliminary authentication may be considered a first authentication. In one example, the full authentication procedure may include each device exchanging at least an additional portion, or all of the AuT. For example, the devices may exchange information to confirm that the AuT is associated with (or bound to) the particular device. This may prevent unauthorized transfer of an AuT from one device to another device.

In some aspects, the full authentication may include exchanging a signature based on the AuT. For example, the signature may include or be derived based on a hashing function of the group authentication key and its associated index, the AS identification information, the group identifier, the station identifier, the key index value, or combinations thereof. In some examples, the group authentication key and associated index value may be maintained at the group member device 115-*h* and used to verify the AuT from the joining device 115-*g* is valid.

At 520, the group member device determines whether the AuT from the joining device is valid, e.g., based on the signature received from the joining device 115-*g*. If so and at 525, the devices are authenticated and may communicate or otherwise exchange content. As discussed, in some examples the preliminary authentication may be considered sufficient for the devices to connect to form the mesh network. In such examples, the full authentication may be considered a second authentication and serve as an increased security measure for the devices.

Figure 6:
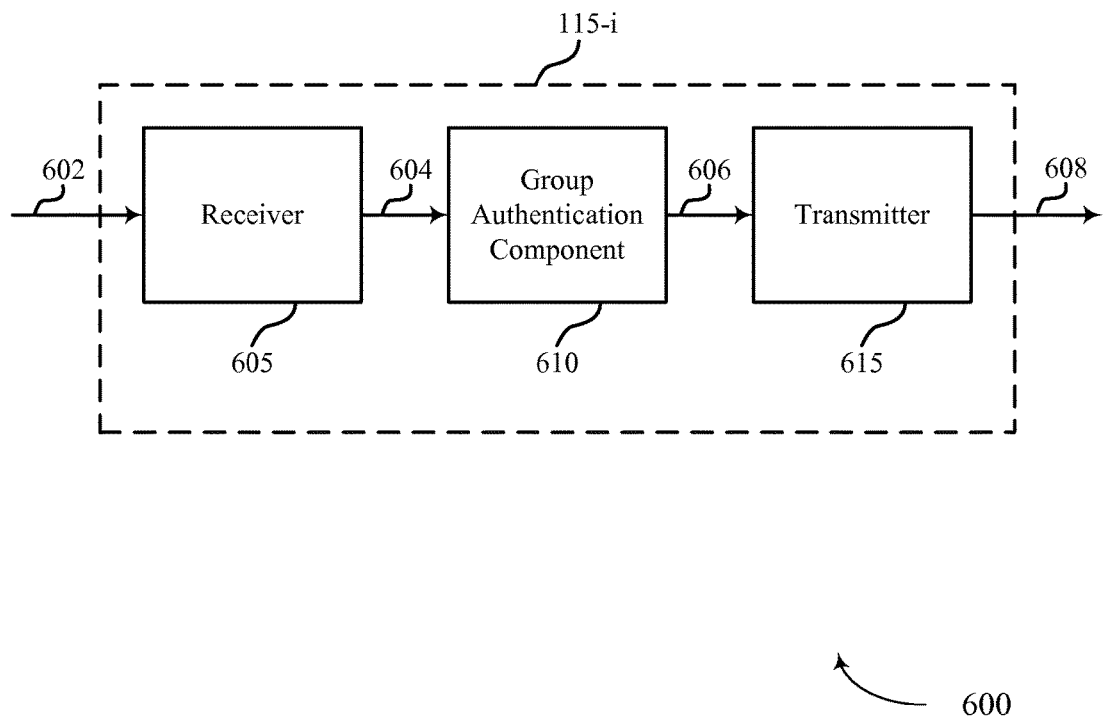
FIG. 6 shows a block diagram of a device configured for use in wireless communication, in accordance with various aspects of the present disclosure.

FIG. 6 shows a block diagram 600 of an apparatus 115-*i* for use in a station for wireless communication, in accordance with various aspects of the present disclosure. In some examples, the apparatus 115-*i* may be an example of aspects of one or more of the wireless stations 115 and/or the devices 115 described with reference to FIGS. 1-5. The apparatus 115-*i* may also be or include a processor (not shown). The apparatus 115-*i* may include a receiver 605, a group authentication component 610, and/or a transmitter 615. Each of these components may be in communication with each other via signals 604 and/or 606.

The apparatus 115-*i*, through the receiver 605, the group authentication component 610, and/or the transmitter 615, may be configured to perform functions described herein. For example, the apparatus 115-*i* may be configured to manage aspects of authentication of the apparatus 115-*i*.

The components of the apparatus 115-*i* may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

The receiver 605 may receive information such as packets, user data, and/or control information associated with various information channels (e.g., control channels, data channels, etc.). The receiver 605 may be configured to receive one or more signals, messages, and the like from an authentication server via link 602 associated with establishment of a group account and receiving an associated group AuT. The receiver 605 may be configured to receive signals, messages, and the like from a different apparatus associated with authenticating the apparatus 115-*i* with the different apparatus. The different apparatus may be associated with the same group. Information may be passed on to the group authentication component 610, and to other components of the apparatus 115-*i*.

The group authentication component 610 may manage one or more aspects of authenticating with a group member device. In some examples, the group authentication component 610 may, via the receiver 605 and/or the transmitter 615, communicate with an AS to establish a group account. The AS may be associated with the group and manage aspects of group AuT creation, management, and distribution. Accordingly, the group authentication component 610 may receive a group AuT based on establishing the group account. The group authentication component 610 may also manage aspects of authenticating the apparatus 115-*i* with another apparatus (e.g., a group member device). In some aspects, the group authentication component 610 may include exchanging one or more aspects of the AuT with the group member device during authentication to confirm that the AuT is associated with the proper group and that the AuT is bound to the apparatus 115-*i*. In some examples, the group authentication component 610 may manage aspects of AuT versioning such that authentication is permitted between devices having a different version of the group AuT.

The transmitter 615 may transmit the one or more signals received from other components of the apparatus 115-*i*. The transmitter 615 may transmit via link 608 various signals, messages, etc., associated with group establishment, group AuT management, and authentication. In some examples, the transmitter 615 may be collocated with the receiver 605 in a transceiver component. The transmitter 615 may include a single antenna, or it may include a plurality of antennas.

Figure 7:
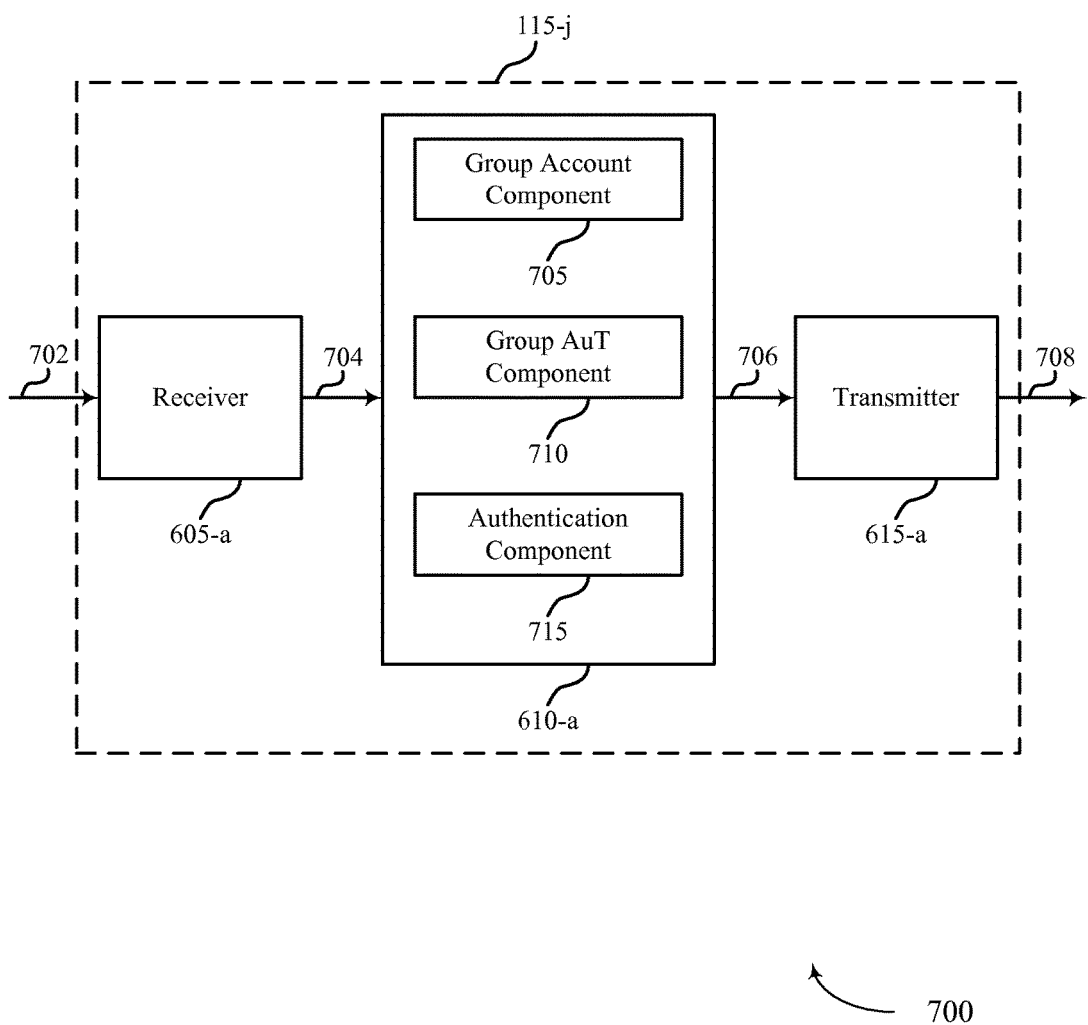
FIG. 7 shows a block diagram of a device configured for use in wireless communication, in accordance with various aspects of the present disclosure.

FIG. 7 shows a block diagram 700 of an apparatus 115-*j* that is used in a wireless station for wireless communication, in accordance with various examples. The apparatus 115-*j* may be an example of one or more aspects of a wireless station 115 and/or the devices 115 described with reference to FIGS. 1-5. It may also be an example of an apparatus 115-*i* described with reference to FIG. 6. The apparatus 115-*j* may include a receiver 605-*a*, a group authentication component 610-*a*, and/or a transmitter 615-*a*, which may be examples of the corresponding components of apparatus 115-*i*. The apparatus 115-*j* may also include a processor (not shown). Each of these components may be in communication with each other via links 704 and/or 706. The group authentication component 610-*a* may include a group account component 705, a group AuT component 710, and an authentication component 715. The receiver 605-*a* and the transmitter 615-*a* may perform the functions of the receiver 605 and the transmitter 615 of FIG. 6, respectively.

The group account component 705 may monitor, manage, or otherwise perform functions related to establishing and/or maintain a group account with an AS. The AS may be associated with the group and may establish, store, etc., the group accounts for devices associated with the group. The group account component 705 may, via the receiver 605-*a* and/or transmitter 615-*a* and links 702 and 708, respectively, manage aspects of communicating with the AS to create the group account, e.g., send identification information associated with the apparatus 115-*j*, personal information associated with a user of the apparatus 115-*j*, etc. As previously discussed, the group may be associated with a wide variety of common interests or features, e.g., a social gaming group for interactive gaming, a location-based group of users within a predetermined proximity, a play group participating in a common activity or sport, and the like. Generally, the group account component 705 may create an account for the particular service and receive information associated with participating in the group.

The group AuT component 710 may monitor, manage, or otherwise perform various functions related to an AuT for the group. Once the account has been created, the group AuT component 710 may receive, via the receiver 605-*a* and link 702, a group AuT to be used to authenticate with other devices or apparatuses associated with the group. As discussed, the group AuT may include a common group secret, may be bound to the apparatus 115-*j*, and may be valid for a predetermined time limit.

In some aspects, the group AuT component 710 may manage aspects of retrieving an updated group AuT. For example, the group AuT component 710 may determine when the apparatus 115-*j* is connected and, therefore, can communicate with the group AS. Accordingly, the group AuT component 710 may communicate with the AS to retrieve the most recent version of the group AuT. In some aspects, the group AuT component 710 may pull the group AuT from the AS and/or the AS may push a group AuT to the group AuT component 710.

In some aspects, the group AuT component 710 may manage aspects of versioning of the group AuT. For example, the group AuT component 710 may determine and/or output information indicative of which version of the group AuT the apparatus 115-*j* is utilizing.

The authentication component 715 may manage, control, or otherwise perform various functions related to authenticating the apparatus 115-*j* with another device. The authentication component 715 may use the group AuT received from the group AuT component 710 and communicate with the group member device, via the transmitter 615-*a* and link 708, to exchange some or all of the components of the group AuT during authentication.

Similarly, the authentication component 715 may manage aspects of the apparatus 115-*j* authenticating a different device, e.g., the authentication component 715 may receive and verify aspects of the AuT from the other device to verify group membership and AuT validity.

In some aspects, the authentication component 715 may manage aspects of authentication using a version of the group AuT that is different than the version being used by the group member device. For example, the apparatus 115-*j* may attempt to authenticate with a group member device that has a newer or an older version of the group AuT. The authentication component 715 may determine whether to permit or deny the authentication based on the differences between the version index for the AuT, the reason code associated with the change in versions, and the like. Accordingly, the authentication component 715 may permit authentication without requiring each device to have the same version of the group AuT.

In some aspects, the authentication component 715 may manage aspects of two-phase authentication. For example, the authentication component 715 may mange a preliminary authentication phase where the devices exchange a portion of the group AuT to confirm that each device is associated with the proper group. If successful, the authentication component 715 may manage a full authentication phase where the group AuT is used to confirm that each device shares a common group key and that each AuT is tied, bound, or otherwise associated with the respective device, e.g., the apparatus 115-*j*.

Figure 8:
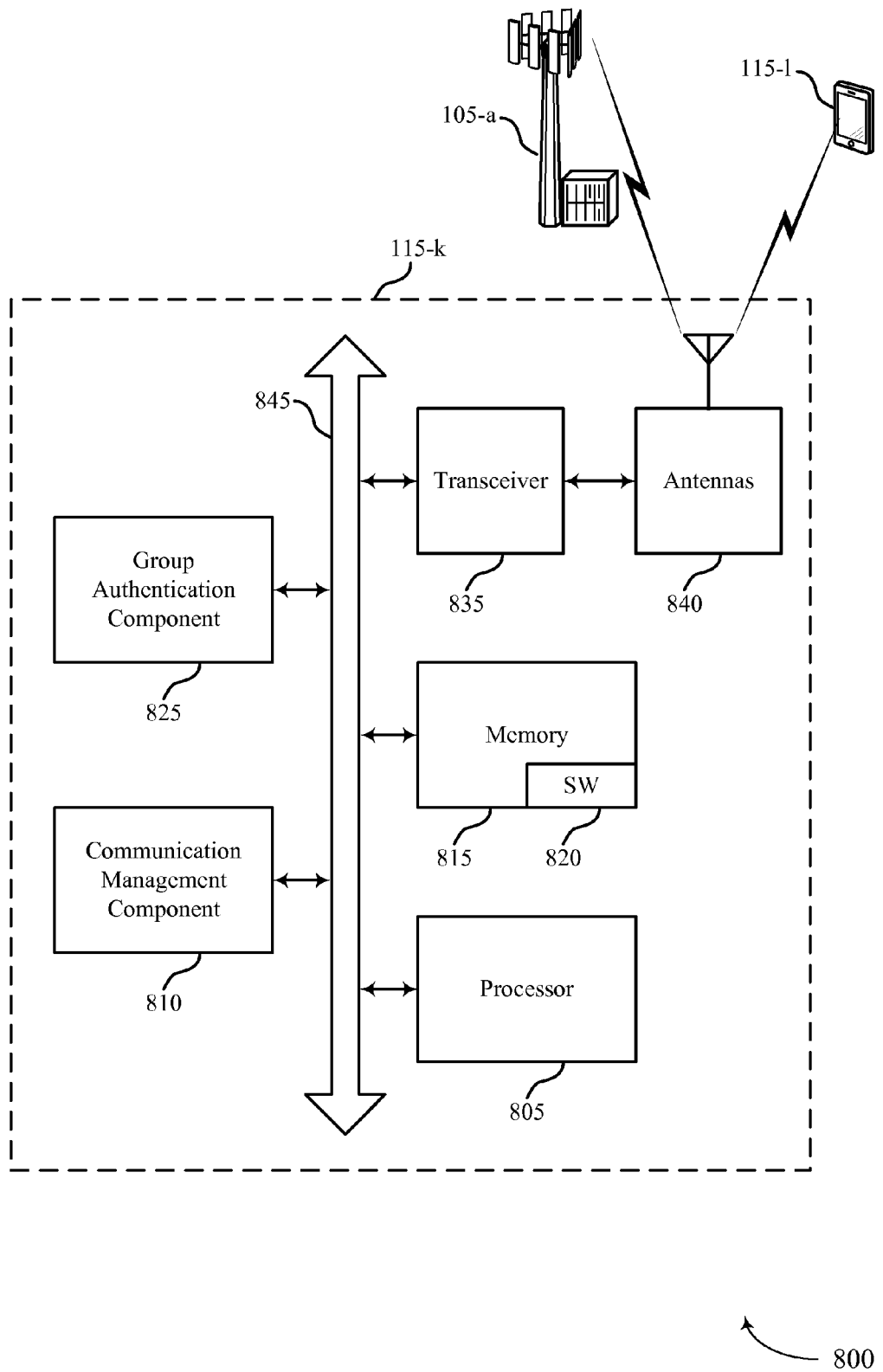
FIG. 8 shows a block diagram of a wireless communication system, in accordance with various aspects of the present disclosure.

Turning to FIG. 8, a diagram 800 is shown that illustrates a wireless station 115-*k* configured for authentication in a network based on a group AuT. The wireless station 115-*k* may have various other configurations and may be included or be part of a personal computer (e.g., laptop computer, netbook computer, tablet computer, etc.), a cellular telephone, a PDA, a digital video recorder (DVR), an internet appliance, a gaming console, an e-readers, etc. The wireless station 115-*k* may have an internal power supply (not shown), such as a small battery, to facilitate mobile operation. The wireless station 115-*k* may be an example of the wireless stations 115, devices 115, and/or apparatuses 115 of FIGS. 1-7.

The wireless station 115-*k* may include a processor 805, a memory 815, a transceiver 835, antennas 840, a group authentication component 825, and a communication management component 810. The group authentication component 825 may be an example of the group authentication component 610 of FIG. 6 or 7. Each of these components may be in communication with each other, directly or indirectly, over at least one bus 845.

The memory 815 may include RAM and ROM. The memory 815 may store computer-readable, computer-executable software (SW) code 820 containing instructions that are configured to, when executed, cause the processor 805 to perform various functions described herein for authentication management. Alternatively, the software code 820 may not be directly executable by the processor 805 but be configured to cause the computer (e.g., when compiled and executed) to perform functions described herein.

The processor 805 may include an intelligent hardware device, e.g., a CPU, a microcontroller, an ASIC, etc. The processor 805 may process information received through the transceiver 835 and/or to be sent to the transceiver 835 for transmission through the antennas 840. The processor 805 may handle, alone or in connection with the group authentication component 825, various aspects for peer-to-peer authentication between devices associated with a group.

The transceiver 835 may be configured to communicate bi-directionally with APs 105 in FIG. 1 and/or with other wireless station 115, devices 115, and/or apparatuses of FIGS. 1-7. The transceiver 835 may be implemented as at least one transmitter component and at least one separate receiver component. The transceiver 835 may include a modem configured to modulate the packets and provide the modulated packets to the antennas 840 for transmission, and to demodulate packets received from the antennas 840. While the wireless station 115-*k* may include a single antenna, there may be aspects in which the wireless station 115-*k* may include multiple antennas 840.

According to the architecture of FIG. 8, the wireless station 115-*k* may further include a communications management component 810. The communications management component 810 may manage communications with various access points. The communications management component 810 may be a component of the wireless station 115-*k* in communication with some or all of the other components of the wireless station 115-*k* over the at least one bus 845. Alternatively, functionality of the communications management component 810 may be implemented as a component of the transceiver 835, as a computer program product, and/or as at least one controller element of the processor 805.

The components of the wireless station 115-*k* may be configured to implement aspects discussed above with respect to FIGS. 1-7, and those aspects may not be repeated here for the sake of brevity.

Figure 9:
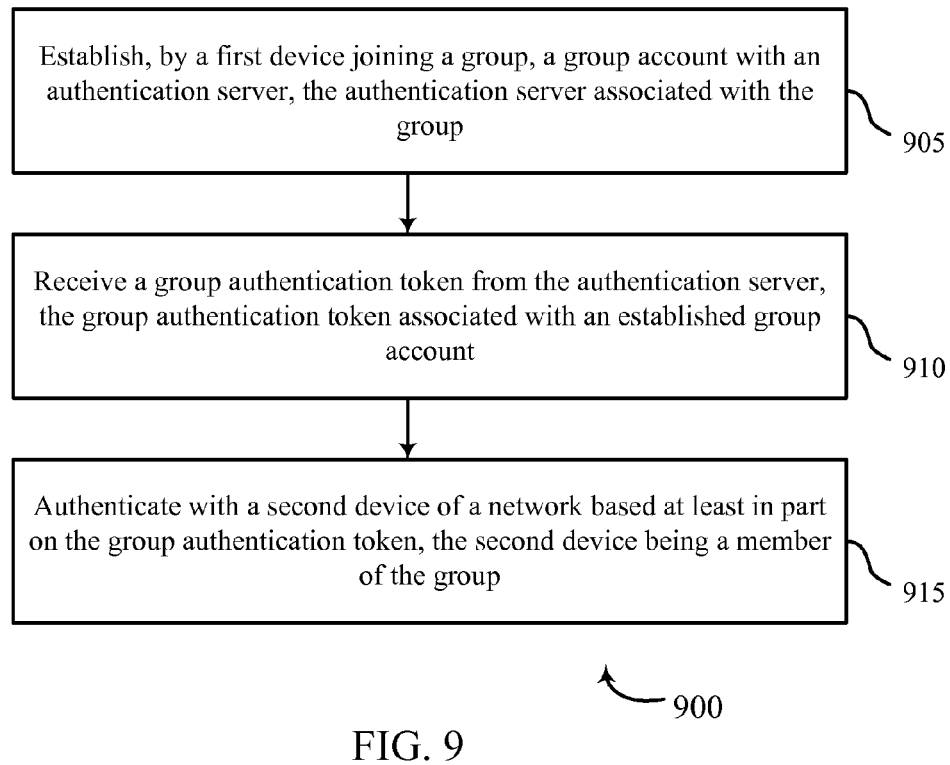
FIG. 9 is a flow chart illustrating an example of a method for wireless communication, in accordance with various aspects of the present disclosure.

FIG. 9 is a flow chart illustrating an example of a method 900 for wireless communication, in accordance with various aspects of the present disclosure. For clarity, the method 900 is described below with reference to aspects of one or more of the wireless stations described with reference to FIG. 1, and/or aspects of one or more of the devices and/or apparatuses described with reference to FIGS. 2-8. In some examples, a wireless station may execute one or more sets of codes to control the functional elements of the wireless station to perform the functions described below. Additionally or alternatively, the wireless station may perform one or more of the functions described below using-purpose hardware.

At block 905, the method 900 may include establishing a group account with an authentication server (AS). The AS may be associated with a group, e.g., a collection of one or more devices sharing at least some common interest, feature, function, etc. The account may be established by a device seeking to join the group, e.g., via an enrollment process where information associated with the device and, in some examples, the user associated with the device are provided to the AS. At block 910, a group AuT may be received from the AS. The group AuT may be associated with the group and, therefore, identify the device establishing the group account as a member of the group. The group AuT may include various components associated with the AS, the device, the group, etc.

At block 915, the device may authenticate with a group member device, e.g., a second device that is already enrolled and a member of the group. The authentication may be based on the group AuT received during the account establishment process and/or on an updated group AuT received subsequently. In some aspects, the joining device (the device seeking to join the group and/or connect to the group member device) may exchange one or more components of the group AuT during the authentication procedure to confirm that each device is a member of the appropriate group and that each group AuT is associated with the respective device.

The operation(s) at block 905, 910, and/or 915 may be performed using the group authentication component 610 described with reference to FIGS. 6-8.

Thus, the method 900 may provide for wireless communication. It should be noted that the method 900 is just one implementation and that the operations of the method 900 may be rearranged or otherwise modified such that other implementations are possible.

Figure 10:
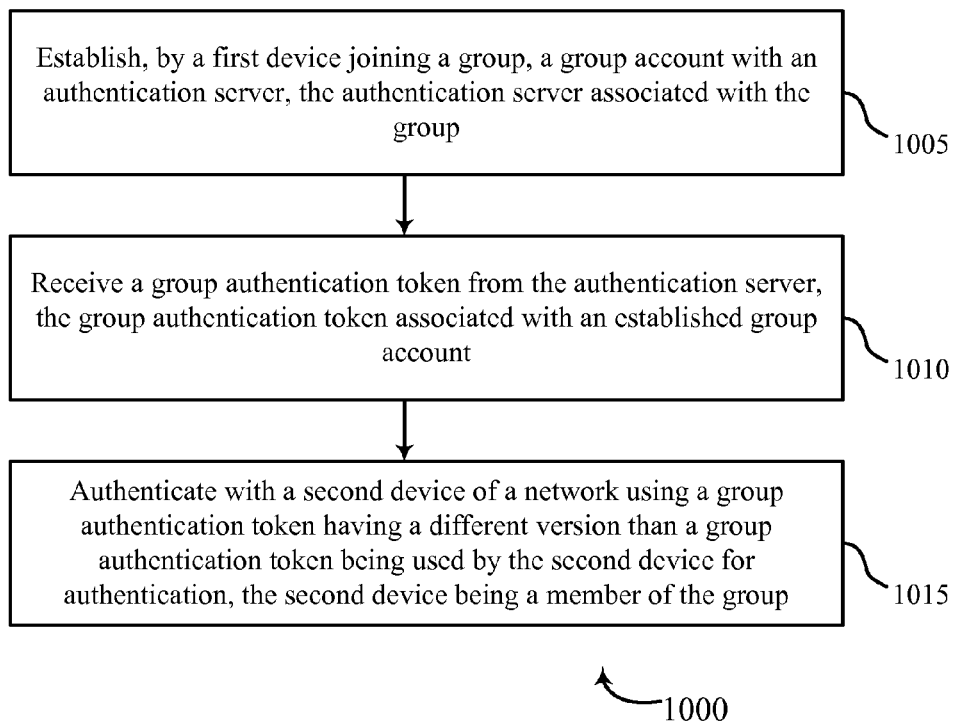
FIG. 10 is a flow chart illustrating an example of a method for wireless communication, in accordance with various aspects of the present disclosure.

FIG. 10 is a flow chart illustrating an example of a method 1000 for wireless communication, in accordance with various aspects of the present disclosure. For clarity, the method 1000 is described below with reference to aspects of one or more of the wireless stations described with reference to FIG. 1, and/or aspects of one or more of the devices and/or apparatuses described with reference to FIGS. 2-8. In some examples, a wireless station may execute one or more sets of codes to control the functional elements of the wireless station to perform the functions described below. Additionally or alternatively, the wireless station may perform one or more of the functions described below using-purpose hardware.

At block 1005, the method 1000 may include establishing a group account with an authentication server (AS). The AS may be associated with a group, e.g., a collection of one or more devices sharing at least some common interest, feature, function, etc. The account may be established by a device seeking to join the group, e.g., via an enrollment process where information associated with the device and, in some examples, the user associated with the device are provided to the AS. At block 1010, a group AuT may be received from the AS. The group AuT may be associated with the group and, therefore, identify the device establishing the group account as a member of the group. The group AuT may include various components associated with the AS, the device, the group, etc.

In some aspects, the group AuT may be changed by the AS on a scheduled or unscheduled basis, e.g., due to scheduled rollover, due to key compromise, etc. Accordingly, each updated group AuT may include an indication of the version of the group AuT, e.g., a version index. The versioning information, alone or in conjunction with other information, may permit the group AuT to be used by devices and provide for authentication between devices having different version group AuTs.

At block 1015, the device may authenticate with a group member device, e.g., a second device that is already enrolled and a member of the group. However, the group member device may use a group AuT for authentication that is the same, newer, or older than the version of the AuT being used by the joining device. In some examples, the devices may authenticate with each other based on the AuTs being within a predetermined number of versions apart, e.g., within one version. In some examples, each group AuT may include an indication of why the group AuT was changed and, based on the reason, the devices may accept or reject authentication based on the reason. Versioning may permit device authentication in the situation where one of the devices does not have a connection to the AS and, therefore, permits large scale network deployment without requiring every device to have the same group AuT.

The operation(s) at block 1005, 1010, and/or 1015 may be performed using the group authentication component 610 described with reference to FIGS. 6-8.

Thus, the method 1000 may provide for wireless communication. It should be noted that the method 1000 is just one implementation and that the operations of the method 1000 may be rearranged or otherwise modified such that other implementations are possible.

Figure 11:
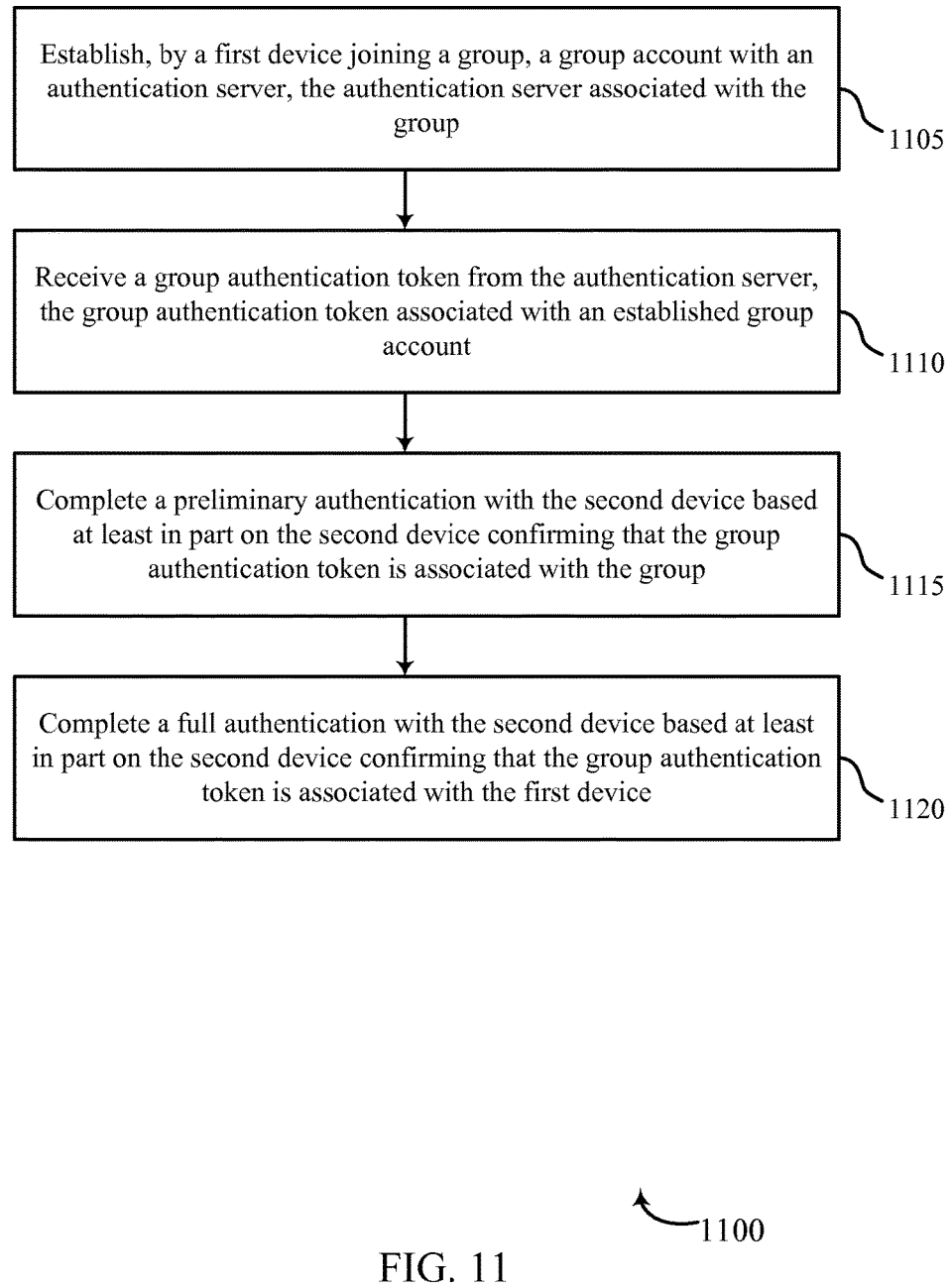
FIG. 11 is a flow chart illustrating an example of a method for wireless communication, in accordance with various aspects of the present disclosure.

FIG. 11 is a flow chart illustrating an example of a method 1100 for wireless communication, in accordance with various aspects of the present disclosure. For clarity, the method 1100 is described below with reference to aspects of one or more of the wireless stations described with reference to FIG. 1, and/or aspects of one or more of the devices and/or apparatuses described with reference to FIGS. 2-8. In some examples, a wireless station may execute one or more sets of codes to control the functional elements of the wireless station to perform the functions described below. Additionally or alternatively, the wireless station may perform one or more of the functions described below using-purpose hardware.

At block 1105, the method 1100 may include establishing a group account with an authentication server (AS). The AS may be associated with a group, e.g., a collection of one or more devices sharing at least some common interest, feature, function, etc. The account may be established by a device seeking to join the group, e.g., via an enrollment process where information associated with the device and, in some examples, the user associated with the device are provided to the AS. At block 1110, a group AuT may be received from the AS. The group AuT may be associated with the group and, therefore, identify the device establishing the group account as a member of the group.

At block 1115, the device may complete a preliminary authentication with the group member device. The preliminary authorization may provide for confirmation that the joining device AuT is associated with the correct group. In some examples, the devices may exchange components of the group AuT indicative of the group, e.g., a group identifier. The preliminary authentication may provide for a quick and simple opportunity for devices to reject joining devices that do not belong to the group.

At block 1120, the device may complete a full authentication with the group member device. The full authentication may include exchanging additional components of the group AuT and, in some aspects, provide confirmation that the group AuT is associated with the respective device. For example, the group AuT may include information unique to the joining device and, therefore, full authentication may provide for confirmation that the group AuT has not been transferred to a different device.

In some aspects, the group AuT versioning features discussed above may also be applied to the two-phase authentication procedure of diagram 1100. In one example, the versioning information may be exchanged during the preliminary authentication phase and, based on the version, reasons for the key change, etc., a simple accept/reject determination can be made. In another example, the versioning information may be exchanged during the full authentication procedure.

The operation(s) at block 1105, 1110, 1115, and/or 1120 may be performed using the group authentication component 610 described with reference to FIGS. 6-8.

Thus, the method 1100 may provide for wireless communication. It should be noted that the method 1100 is just one implementation and that the operations of the method 1100 may be rearranged or otherwise modified such that other implementations are possible.

Figure 12:
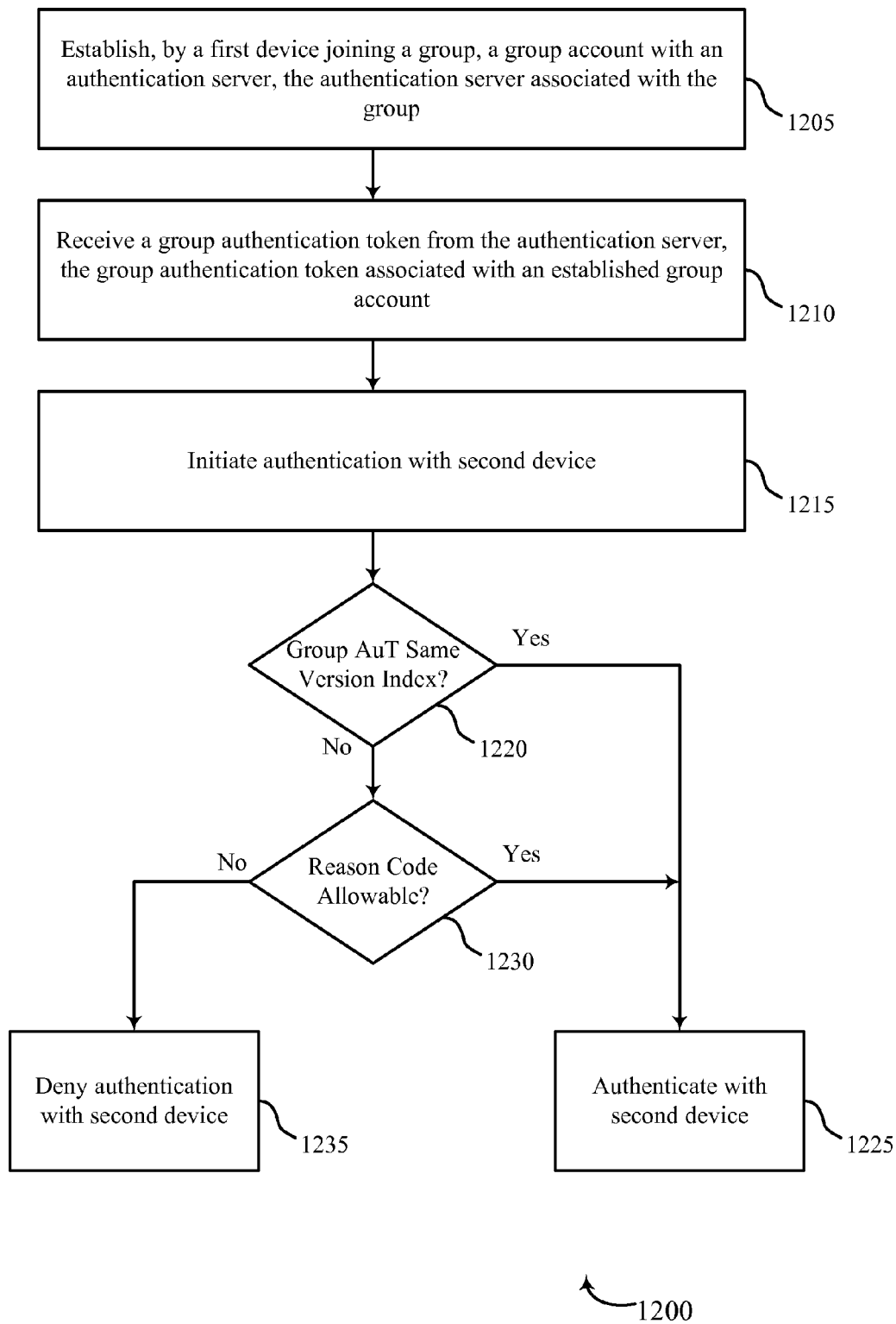
FIG. 12 is a flow chart illustrating an example of a method for wireless communication, in accordance with various aspects of the present disclosure.

FIG. 12 is a flow chart illustrating an example of a method 1200 for wireless communication, in accordance with various aspects of the present disclosure. For clarity, the method 1200 is described below with reference to aspects of one or more of the wireless stations described with reference to FIG. 1, and/or aspects of one or more of the devices and/or apparatuses described with reference to FIGS. 2-8. In some examples, a wireless station may execute one or more sets of codes to control the functional elements of the wireless station to perform the functions described below. Additionally or alternatively, the wireless station may perform one or more of the functions described below using-purpose hardware.

At block 1205, the method 1200 may include establishing a group account with an authentication server (AS). The AS may be associated with a group, e.g., a collection of one or more devices sharing at least some common interest, feature, function, etc. The account may be established by a device seeking to join the group, e.g., via an enrollment process where information associated with the device and, in some examples, the user associated with the device are provided to the AS. At block 1210, a group AuT may be received from the AS. The group AuT may be associated with the group and, therefore, identify the device establishing the group account as a member of the group. At block 1215, the device may initiate an authentication procedure with a group member device.

At block 1220, the authentication procedure may include determining whether the group AuT is the same version as the group AuT being used by the group member device. For example, the joining device and the group member device may exchange, among other information, the version index for the group AuT to determine if there is a disparity in the versions. If the group AuT have the same version index, the method 1200 may include at block 1225 authenticating with the group member device, e.g., confirmation that the group AuT is associated with the appropriate group and confirmation that the group AuT is bound to the joining device.

If the group AuT versions are not the same, the method 1200 may proceed to block 1230 where the reason code is examined to determine if it is allowable. For example, a reason code indicating that the group AuT was changed (and the version index changed) due to key compromise, may be grounds to reject an group AuT having a different version. To the contrary, a reason code indicating that the group AuT was changed due to a regularly scheduled change may be grounds to accept the group AuT having a different version. Accordingly, the devices may determine the reason for the different version indexes for their respective group AuT and, based on that determination, determine whether to proceed with authentication. If the reason code is not allowable, the method 1200 may proceed to block 1235 where authentication is denied.

The operation(s) at block 1205, 1210, 1215, 1220, 1225, 1230 and/or 1235 may be performed using the group authentication component 610 described with reference to FIGS. 6-8.

Thus, the method 1200 may provide for wireless communication. It should be noted that the method 1200 is just one implementation and that the operations of the method 1200 may be rearranged or otherwise modified such that other implementations are possible.

In some examples, aspects from two or more of the methods 900-1200 may be combined. It should be noted that the methods 900, 1000, 1100, etc. are just example implementations, and that the operations of the methods 900-1200 may be rearranged or otherwise modified such that other implementations are possible.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
   establishing, by a first device joining a group, a group account with an authentication server, the authentication server associated with the group;
   receiving, by the first device, a group authentication token from the authentication server, the group authentication token associated with an established group account; and
   authenticating with a second device based at least in part on the group authentication token of the first device, the second device being a member of the group and performing an authentication process with a version of the group authentication token different from a version of the group authentication token of the first device, wherein a reason code corresponding to one of the version of the group authentication token of the first device or the version of the group authentication token of the second device is used in the authentication process to determine whether to complete authentication of the first device by the second device.

2. The method of claim 1, wherein establishing the group account comprises:
   establishing, by the first device joining the group, the group account with the authentication server while the first device is in a connected state with the authentication server; and
   wherein receiving the group authentication token comprises: receiving, by the first device, the group authentication token from the authentication server while the first device is in a connected state with the authentication server; and
   wherein authenticating comprises:
   authenticating with the second device based at least in part on the group authentication token while the first device is in a disconnected state with the authentication server.

3. The method of claim 1, wherein authenticating comprises:
   completing a first authentication process with the second device based at least in part on the second device confirming that the group authentication token is associated with the group; and
   completing a second authentication process with the second device based at least in part on the second device confirming that the group authentication token is associated with the first device.

4. The method of claim 1, wherein receiving the group authentication token comprises:
   receiving, by the first device, the group authentication token as an updated group authentication token from the authentication server, the group authentication token being received based at least in part on an update process comprising one of a periodic schedule, an aperiodic schedule, or combinations thereof.

5. The method of claim 1, wherein each version of the group authentication token comprises a corresponding version index.

6. The method of claim 1, wherein the version of the group authentication token being used by the first device is a newer version of the group authentication token than the version being used by the second device.

7. The method of claim 1, wherein the version of the group authentication token being used by the first device is an older version of the group authentication token than the version being used by the second device.

8. The method of claim 1, wherein each reason code indicates a corresponding reason associated with an update to the corresponding group authentication token.

9. The method of claim 1, wherein the reason code corresponding to one of the version of the group authentication token of the first device or the version of the group authentication token of the second device indicates a reason that prohibits the first device from completing authentication with the second device.

10. The method of claim 1, wherein the reason code corresponding to one of the version of the group authentication token of the first device or the version of the group authentication token of the second device indicates a reason that permits the first device to complete authentication with the second device.

11. The method of claim 1, wherein the group authentication token comprises one of a group identifier associated with the group, an authentication server identifier, a first device identifier, a group authentication key, a version index associated with the group authentication key, a timing information field, or combinations thereof.

12. The method of claim 1, wherein the group authentication token is valid for a predetermined time period.

13. The method of claim 1, wherein the network is a mesh network.

14. The method of claim 1, wherein the network is a social Wi-Fi mesh network.

15. An apparatus for wireless communication, comprising:
   a processor;
   memory in electronic communication with the processor; and
   instructions being stored in the memory, the instructions being executable by the processor to:

establish a group account with an authentication server, the authentication server associated with a group;

receive a group authentication token from the authentication server, the group authentication token associated with an established group account; and authenticate with a second device based at least in part on the group authentication token of the apparatus, the second device being a member of the group and performing an authentication process with a version of the group authentication token different from a version of the group authentication token of the apparatus, wherein a reason code corresponding to one of the version of the group authentication token of the apparatus or the version of the group authentication token of the second device is used in the authentication process to determine whether to complete authentication of the apparatus by the second device.

16. The apparatus of claim 15, wherein the instructions executable by the processor to establish the group account with the authentication server further comprise instructions executable by the processor to:

establish the group account with the authentication server while in a connected state with the authentication server; and wherein the instructions executable by the processor to receive the group authentication token further comprise instructions executable by the processor to:

receive the group authentication token from the authentication server while in a connected state with the authentication server; and wherein the instructions executable by the processor to authenticate further comprise instructions executable by the processor to:

authenticate with the second device based at least in part on the group authentication token while in a disconnected state with the authentication server.

17. The apparatus of claim 15, wherein the instructions executable by the processor to authenticate further comprise instructions executable by the processor to:

complete a first authentication process with the second device based at least in part on the second device confirming that the group authentication token is associated with the group; and complete a second authentication process with the second device based at least in part on the second device confirming that the group authentication token is associated with the apparatus.

18. The apparatus of claim 15, wherein the instructions executable by the processor to receive the group authentication token further comprise instructions executable by the processor to:

receive the group authentication token as an updated group authentication token from the authentication server, the group authentication token being received based at least in part on an update process comprising one of a periodic schedule, an aperiodic schedule, or combinations thereof.

19. The apparatus of claim 15, wherein each version of the group authentication token comprises a corresponding version index.

20. The apparatus of claim 15, wherein the version of the group authentication token being used by the apparatus is a newer version of the group authentication token than the version being used by the second device.

21. The apparatus of claim 15, wherein the version of the group authentication token being used by the apparatus is an older version of the group authentication token than the version being used by the second device.

22. The apparatus of claim 15, wherein each reason code indicates a corresponding reason associated with an update to the corresponding group authentication token.

23. The apparatus of claim 15, wherein the reason code corresponding to one of the version of the group authentication token of the apparatus or the version of the group authentication token of the second device indicates a reason that prohibits the apparatus from completing authentication with the second device.

24. The apparatus of claim 15, wherein the reason code corresponding to one of the version of the group authentication token of the apparatus or the version of the group authentication token of the second device indicates a reason code that permits the apparatus to complete authentication with the second device.

25. The apparatus of claim 15, wherein the group authentication token comprises one of a group identifier associated with the group, an authentication server identifier, an apparatus identifier, a group authentication key, a version index associated with the group authentication key, a timing information field, or combinations thereof.

26. The apparatus of claim 15, wherein the group authentication token is valid for a predetermined time period.

27. The apparatus of claim 15, wherein the network is a social Wi-Fi mesh network.

28. An apparatus for wireless communication, comprising:

means for establishing a group account with an authentication server, the authentication server associated with a group;

means for receiving a group authentication token from the authentication server, the group authentication token associated with an established group account; and means for authenticating with a second device based at least in part on the group authentication token of the apparatus, the second device being a member of the group and performing an authentication process with a version of the group authentication token different from a version of the group authentication token of the first device, wherein a reason code corresponding to one of the version of the group authentication token of the apparatus or the version of the group authentication token of the second device is used in the authentication process to determine whether to complete authentication of the apparatus by the second device.

29. The apparatus of claim 28, wherein the means for establishing the group account comprises:

means for establishing the group account with the authentication server while the first device is in a connected state with the authentication server; and wherein means for receiving the group authentication token comprises:

means for receiving the group authentication token while in a connected state with the authentication server; and wherein means for authenticating comprises:

means for authenticating with the second device based at least in part on the group authentication token while in a disconnected state with the authentication server.

30. A non-transitory computer-readable medium storing computer-executable code for wireless communication, the code executable by a processor to:

establish a group account with an authentication server, the authentication server associated with a group;

receive a group authentication token from the authentication server, the group authentication token associated with an established group account; and authenticate with a second device based at least in part on the group authentication token received by the processor of a first device, the second device being a member of the group and performing an authentication process with a version of the group authentication token different from a version of the group authentication token received by the processor of the first device, wherein a reason code corresponding to one of the version of the group authentication token received by the processor of the first device or the version of the group authentication token of the second device is used in the authentication process to determine whether to complete authentication of the first device by the second device.

\* \* \* \* \*